G. W. Seymour.
Carriage-Wheel.
No. 81,828.  Patented Sept. 1, 1868.
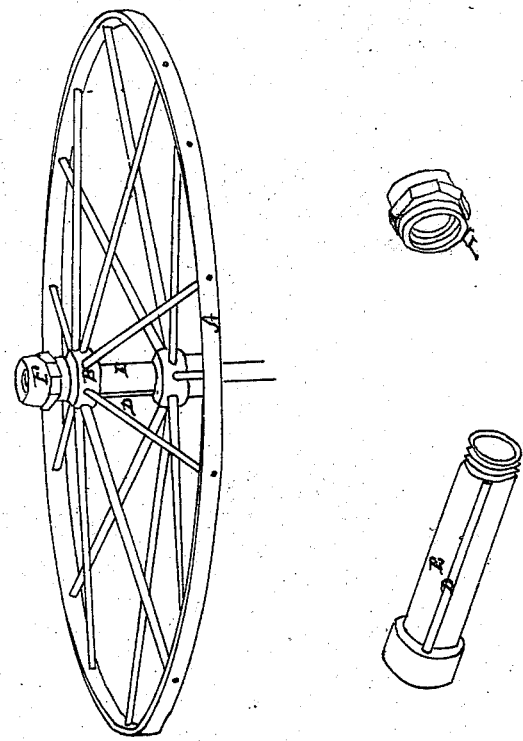
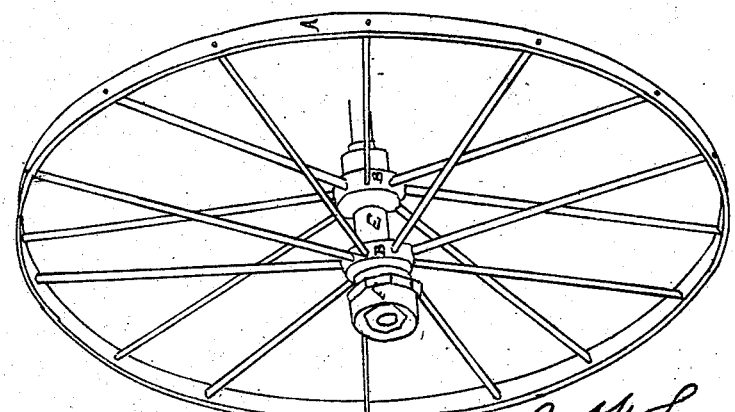
Witnesses  Geo. W. Seymour
John Chubbuck.  per J. E. Mosier
 his attorney

United States Patent Office.

GEORGE W. SEYMOUR, OF WHITNEY'S POINT, NEW YORK.

Letters Patent No. 81,828, dated September 1, 1868.

IMPROVED CARRIAGE-WHEEL.

The Schedule referred to in these Letters Patent and making part of the same.

TO ALL WHOM IT MAY CONCERN:

Be it known that I, GEORGE W. SEYMOUR, of Whitney's Point, in the county of Broome, and State of New York, have invented a new and useful Improvement on Carriage-Wheels; and I do hereby declare that the following is a full, clear, and exact description of the same, reference being had to the accompanying drawings, making a part of this specification, in which—

Figure 1 is a perspective view representing the wheel and axle.

Figure 2 shows the wheel in a horizontal position with the axle-box and adjusting-nut detached.

Similar letters of reference indicate corresponding parts in each figure.

The nature of my invention consists of a metallic carriage-wheel with an adjustable hub comprising two movable rings, which support the axle-box, each carrying an equal number of spokes centring in the rim. These rings are set a sufficient distance apart to give the required bracing angle to the spokes, and may be compressed or loosened to a certain extent, by means of a nut and screw on the outer end of the axle-box, for the purpose of regulating the tension of the spokes.

To enable others to make and use my invention, I will proceed to describe its construction and operation.

I construct the rim A and spokes of my carriage-wheel of wrought iron or steel. The hub-rings B B may be made of either cast or wrought iron, and a key-seat cut for the stationary key D on the axle-box E. These key-seats should be made loose enough for the rings to move in freely on said axle-box. If I use sixteen spokes in the wheel, I drill eight holes in each ring, "tap" them, and screw in the spokes to their shoulders. The rim is then formed to the proper diameter and lapped for welding, the holes for the spokes drilled and countersunk. I then place the axle-box E into the rings, enter the spokes, rivet them, and weld the lap of the rim. I then cut a left-handed screw on the outer end of the cylindrical axle-box for the right-hand wheel, and *vice versa* for the left-hand wheel for a thimble-nut, F, by which the tension of the wheel may be adjusted by compressing or loosening the rings B B, thereby giving it a slight degree of elasticity. The wheel is secured on the axle in the usual manner, by a nut working inside of the thimble-nut F.

In use it is found that my improved wheel works with less jar and noise than those in ordinary use, and if the joints should become loose from wear or other cause, they may be readily brought to their proper tension by a turn of the adjustable nut F. This wheel may be manufactured at one-quarter less expense than the ordinary wheel, and is more durable and perfect in its operation.

What I claim, and desire to secure by Letters Patent, is—

The combination and arrangement of the stationary key D with the wheel turning the axle-box E, adjustable thimble-nut F, and movable rings B B, all being constructed substantially as herein described and represented, for the purpose set forth.

GEO. W. SEYMOUR.

Witnesses:
C. E. MARTIN,
E. B. HEMINGWAY.